US009418513B2

(12) United States Patent
Barbalet

(10) Patent No.: US 9,418,513 B2
(45) Date of Patent: Aug. 16, 2016

(54) GAMING SYSTEM AND A METHOD OF GAMING

(71) Applicant: Aristocrat Technologies Australia Pty Limited, North Ryde (AU)

(72) Inventor: Thomas Samuel Barbalet, Las Vegas, NV (US)

(73) Assignee: Aristocrat Technologies Australia Pty Limited, North Ryde, NSW (AU)

( * ) Notice: Subject to any disclaimer, the term of this patent is extended or adjusted under 35 U.S.C. 154(b) by 554 days.

(21) Appl. No.: 13/742,921

(22) Filed: Jan. 16, 2013

(65) Prior Publication Data

US 2013/0184069 A1 Jul. 18, 2013

Related U.S. Application Data

(60) Provisional application No. 61/586,987, filed on Jan. 16, 2012.

(51) Int. Cl.

*G06F 17/00* (2006.01)
*G06F 19/00* (2011.01)
*G07F 17/32* (2006.01)

(52) U.S. Cl.

CPC ........ *G07F 17/3258* (2013.01); *G07F 17/3223* (2013.01); *G07F 17/3225* (2013.01); *G07F 17/3227* (2013.01); *G07F 17/3274* (2013.01)

(58) Field of Classification Search

CPC ......................... G07F 17/3225; G07F 17/3244
See application file for complete search history.

(56) References Cited

U.S. PATENT DOCUMENTS 5,116,055 A * 5/1992 Tracy ........................ G07F 5/18 273/143 R
5,564,700 A * 10/1996 Celona ................ G07F 17/3211 463/20
5,830,063 A 11/1998 Byrne
6,077,162 A * 6/2000 Weiss ...................... G07F 17/32 273/143 R
6,089,980 A * 7/2000 Gauselmann .................. 463/27
6,206,782 B1 * 3/2001 Walker .................... G07F 17/32 463/20
6,210,275 B1 * 4/2001 Olsen ............................ 463/16
6,336,862 B1 1/2002 Byrne
6,425,823 B1 7/2002 Byrne
6,712,695 B2 * 3/2004 Mothwurf et al. .............. 463/25
6,758,748 B2 7/2004 Byrne
6,887,154 B1 * 5/2005 Luciano et al. ................. 463/26
6,935,958 B2 * 8/2005 Nelson ............................ 463/42
7,217,188 B2 5/2007 Byrne
7,316,611 B2 1/2008 Byrne
7,351,140 B2 4/2008 Wolf et al.
7,500,915 B2 * 3/2009 Wolf et al. ...................... 463/27
7,717,788 B2 * 5/2010 Rowe ................. G06Q 30/0209 463/25
8,864,586 B2 * 10/2014 Nguyen .................. G07F 17/32 463/42
2001/0036857 A1 * 11/2001 Mothwurf ........... A63F 3/00157 463/25
2002/0107715 A1 * 8/2002 Pace .................. G06Q 10/0631 705/7.13

(Continued)

*Primary Examiner* — Steven J Hylinski
(74) *Attorney, Agent, or Firm* — Armstrong Teasdale LLP

(57) ABSTRACT

There is described a gaming system including an award controller for allocating an award at a plurality of gaming machines. The award controller is arranged to allocate, in response to a win at a first gaming machine of the plurality of gaming machines, an award to a player of at least one further gaming machine of the plurality of gaming machines based on a location of the at least one further gaming machine.

22 Claims, 8 Drawing Sheets

(56) References Cited

U.S. PATENT DOCUMENTS

| | | | | |
|---|---|---|---|---|
| 2003/0148809 | A1* | 8/2003 | Nelson | G07F 17/32 463/29 |
| 2005/0054430 | A1* | 3/2005 | Pitman et al. | 463/25 |
| 2007/0184896 | A1 | 8/2007 | Dickerson | |
| 2008/0058098 | A1 | 3/2008 | Seelig et al. | |
| 2008/0064492 | A1 | 3/2008 | Oosthoek | |
| 2008/0176650 | A1 | 7/2008 | Wolf et al. | |
| 2009/0011825 | A1 | 1/2009 | Lima et al. | |
| 2010/0331076 | A1 | 12/2010 | Dickerson | |
| 2011/0111860 | A1* | 5/2011 | Nguyen | 463/42 |
| 2011/0201416 | A1 | 8/2011 | Jaffe | |
| 2012/0061915 | A1 | 3/2012 | Snow | |
| 2012/0088576 | A1* | 4/2012 | Shepherd | G07F 17/3258 463/26 |
| 2012/0098201 | A1 | 4/2012 | Matthews et al. | |
| 2012/0115561 | A1* | 5/2012 | Morrow | G07F 17/3267 463/16 |
| 2013/0116032 | A1* | 5/2013 | Lutnick | G07F 17/3276 463/17 |

* cited by examiner

GAMING SYSTEM AND A METHOD OF GAMING

CROSS-REFERENCE TO RELATED APPLICATIONS

The present application claims the benefit of priority to U.S. Provisional Patent Application No. 61/586,987, filed on Jan. 16, 2012, entitled "A GAMING SYSTEM AND A METHOD OF GAMING", which is herein incorporated by reference in its entirety.

FIELD OF THE INVENTION

The present invention relates to a gaming system and to a method of gaming.

BACKGROUND

A plurality of gaming machines can be arranged such that games played thereon contribute to a progressive jackpot award. This can increase the total award that a player may receive in the event of a win on a gaming machine that is participating in a progressive jackpot compared to a gaming machine that is not participating in a progressive jackpot.

Due to the possibility of obtaining a larger than normal award, progressive jackpots can add to the excitement of playing gaming machines with this feature. As such, it is desirable to provide further features and/or incentives to players who participate in games associated with progressive jackpot awards.

SUMMARY

In accordance with a first aspect of the present invention there is provided a gaming system comprising:

an award controller for allocating an award and being arranged to allocate, in response to a win at a first gaming machine of a plurality of gaming machines, an award to a player of a further gaming machine of the plurality of gaming machines based on a location of the further gaming machine.

In one embodiment, the gaming system includes a win information receiver arranged to receive win information that is indicative of a win at at least the first gaming machine of the plurality of gaming machines, the gaming system being arranged to use the received win information to allocate an award to the player of the further gaming machine.

In one embodiment, the win information includes information indicative of a type of win and the award controller is arranged to allocate an award to the player of the further gaming machine if the received information is indicative of a predefined win type at the first gaming machine. In one example, the predefined win type is a jackpot type win.

The gaming system may be arranged to receive location information indicative of a location of at least the first gaming machine and the further gaming machine. It will be appreciated that the location information may be stored in the gaming system and/or received from respective gaming machines as needed.

The gaming system may be arranged to allocate an award to the player of the further gaming machine based on the location of the further gaming machine relative to the location of the first gaming machine.

It will be appreciated that the further gaming machine may include a plurality of further gaming machines, and the gaming system may be arranged to allocate an award to respective players of the plurality of further gaming machines based on a location of each further gaming machine. The gaming system may be arranged to allocate an award to respective players of further gaming machines based on a location of each further gaming machine relative to the location of the first gaming machine.

In one embodiment, the gaming system is arranged to allocate an award to respective players of further gaming machines of the plurality of gaming machines in accordance with a location pattern of the further gaming machines relative to the first gaming machine.

In one example, the location pattern is associated with a floor plan layout of the plurality of gaming machines.

The gaming system may be arranged to allocate an award to respective players of at least two gaming machines sequentially. In one example, the gaming system is arranged to allocate an award to the player of the first gaming machine, and thereafter to a player of the further gaming machine. The gaming system may be arranged to allocate awards to respective players of further gaming machines of the plurality of gaming machines sequentially and based on a location of each further gaming machine relative to the first gaming machine such that awards are allocated in order of a distance of each further gaming machine from the first gaming machine.

In this way, awards can be allocated to players of gaming machines in sequence from nearest to furthest from the first gaming machine.

Further, in this way, the gaming system can be arranged to allocate awards to players of gaming machines in accordance with both the location of their gaming machine and time. For example, awards can be allocated to players of gaming machines in a sequence radiating outwardly from the first gaming machine, or in such a way that awards are allocated to gaming machines in a particular geometric progression based on a floor plan layout of the plurality of gaming machines.

In one example, awards are allocated in a sequence and according to a location pattern such that, when viewed from above, the gaming machines appear to be allocated an award in accordance with a ripple-like pattern, in a pattern that appears to bounce from one gaming machine to a next gaming machine, in a moving concentric circle pattern, or in any other desirable or appropriate sequence or pattern.

It will be appreciated that each gaming machine that is allocated an award may provide an appropriate response thereto, such as a particular sequence of lighting effects and/or sound effects, such that it is clear that the allocation of awards to the gaming machines is linked to the win at the first gaming machine.

The award controller may be arranged such that the award allocated to the player of the at least one further gaming machine is at least a portion of an award allocated to a player of the first machine provided in response to the win at the first gaming machine.

The first and the further gaming machines may be linked to one another such that the first and the further gaming machines each contribute to a jackpot award and the gaming machine award controller may be arranged to allocate at least a portion of the jackpot award to the player of the further gaming machine in response to the win at the first gaming machine.

In accordance with a second aspect of the present invention, there is provided a method of gaming including:

using an award controller that is arranged to allocate an award at a plurality of gaming machines to:

determine a win at a first gaming machine of a plurality of gaming machines; and allocate an award to a player of a further gaming machine of the plurality of gaming machines in response to the win at the first gaming machine and based on a location of the further gaming machine.

The method may further include:

receiving win information indicative of a win at at least the first gaming machine of the plurality of gaming machines; and using the received win information to allocate an award to the player of the further gaming machine.

The win information may include information that is indicative of a type of win and the method may include allocating an award to the player of the further gaming machine if the received information is indicative of a predefined win type at the first gaming machine. The predefined win type may be a jackpot type win.

In one embodiment, the method further includes:

receiving location information indicative of a location of at least the first gaming machine and the further gaming machine; and allocating an award to the player of the further gaming machine based on the location of the further gaming machine relative to the location of the first gaming machine.

The method may further include allocating an award to respective players of further gaming machines in accordance with a location pattern of the further gaming machines relative to the first gaming machine. The location pattern may be associated with a floor plan layout of the plurality of gaming machines.

In one embodiment, the method includes allocating an award to respective players of at least two gaming machines sequentially. An award may be allocated to a player of the first gaming machine, and thereafter to the player of the further gaming machine.

The method may include allocating awards to respective players of further gaming machines of the plurality of gaming machines sequentially and based on a location of each further gaming machine relative to the first gaming machine such that awards are allocated in order of a distance of each further gaming machine from the first gaming machine.

In one embodiment, the method includes allocating awards to respective players of further gaming machines of the plurality of gaming machines in accordance with a particular geometric progression based on a floor plan layout of the plurality of gaming machines and in response to a win at the first gaming machine. Awards may be allocated in a sequence and according to a location pattern such that, when viewed from above, the gaming machines appear to be allocated an award in accordance with a ripple-like pattern, in a pattern that appears to bounce from one gaming machine to a next gaming machine, in a moving concentric circle pattern, or in any other desirable or appropriate sequence or pattern.

Each gaming machine that is allocated an award may be arranged to provide an appropriate response thereto such that it is clear that the allocation of awards to the gaming machines is linked to the win at the first gaming machine.

In one embodiment, the award allocated to the player of the further gaming machine is at least a portion of an award allocated to a player of the first machine provided in response to the win at the first gaming machine.

The first and the further gaming machines may be linked to one another such that the first and the further gaming machines each contribute to a jackpot award and the award controller is arranged to allocate at least a portion of the jackpot award to the player of the further gaming machine in response to the win at the first gaming machine.

In accordance with a third aspect of the present invention, there is provided a computer program arranged when loaded into a computer to instruct the computer to operate in accordance with the gaming system of the first aspect.

In accordance with a fourth aspect of the present invention, there is provided a computer readable medium having a computer readable program code embodied therein for causing a computer to operate in accordance with the gaming system of the first aspect.

In accordance with a fifth aspect of the present invention, there is provided a data signal having a computer readable program code embodied therein to cause a computer to operate in accordance with the gaming system of the first aspect.

BRIEF DESCRIPTION OF THE DRAWINGS

In order that the present invention may be more clearly ascertained, embodiments of the present invention will now be described, by way of example only, with reference to the accompanying drawings, in which.

Figure 1:
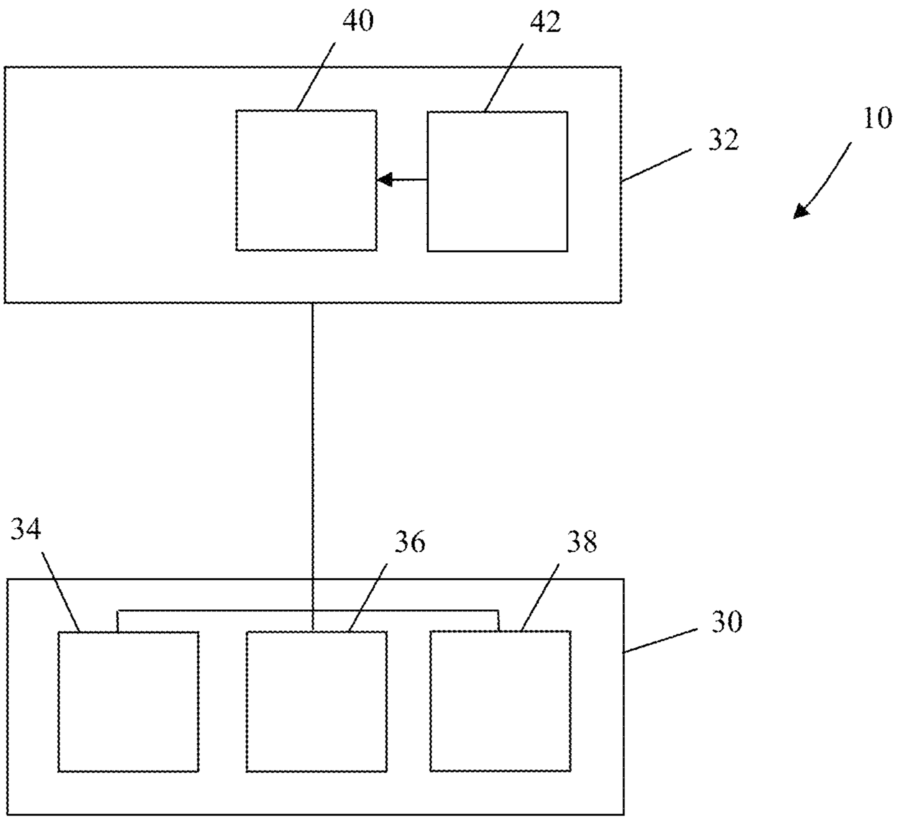
FIG. 1 is a schematic block diagram of components of a gaming system in accordance with an embodiment of the present invention.

In addition, the drawings are for the purpose of illustrating example embodiments, but it is understood that the present disclosure is not limited to the arrangements and instrumentality shown in the drawings.

DESCRIPTION OF CERTAIN EMBODIMENT(S)

Although the following discloses example systems, methods, apparatus, and articles of manufacture including, among other components, firmware and/or software executed on hardware, it should be noted that such systems, methods, apparatus, and/or articles of manufacture are merely illustrative and should not be considered as limiting. For example, it is contemplated that any or all of these firmware, hardware, and/or software components could be embodied exclusively in hardware, exclusively in software, exclusively in firmware, or in any combination of hardware, software, and/or firmware. Accordingly, while the following describes example systems, methods, apparatus, and/or articles of manufacture, the examples provided are not the only way(s) to implement such systems, methods, apparatus, and/or articles of manufacture.

When any of the appended claims are read to cover a purely software and/or firmware implementation, at least one of the elements in at least one example is hereby expressly defined to include a tangible medium such as a memory, DVD, CD, Blu-ray, and so on, storing the software and/or firmware.

Reference herein to "embodiment" means that a particular feature, structure, or characteristic described in connection with the embodiment can be included in at least one example embodiment of the invention. The appearances of this phrase in various places in the specification are not necessarily all referring to the same embodiment, nor are separate or alternative embodiments mutually exclusive of other embodiments. As such, the embodiments described herein, explicitly and implicitly understood by one skilled in the art, can be combined with other embodiments.

Gaming machines can be linked such that players contribute to, and have a chance of winning, a progressive jackpot. For example, a proportion of each wager made at each linked gaming machine can contribute towards the progressive jackpot. If a player of a linked gaming machine achieves a particular outcome on such a gaming machine, the player is awarded the progressive jackpot.

In embodiments of the present invention, when a player wins a progressive jackpot on a first gaming machine, an award is also provided to a player of a further gaming machine based on a location of the further gaming machine. Further, such an award may be provided to a plurality of players of respective further gaming machines. For example, players of gaming machines adjacent the first gaming machine may be provided with an award in response to a progressive jackpot win at the first gaming machine.

The location of the further gaming machine or machines may be relative to the first gaming machine. The location of the further gaming machines may be determined based on a pattern of the further gaming machines relative to the first gaming machine, the pattern being based on a floor plan layout of the gaming machines. Further, awards may be provided to the further gaming machines based on time. In this way, if a spectator is watching the gaming machines from an elevated position, such as from an elevated walkway overlooking a casino floor, they will notice awards being provided throughout the casino floor in moving patterns in response to a progressive jackpot win at a first gaming machine.

In general, the gaming machines operate such that, during game play, a plurality of symbols are randomly selected from a set of symbols and displayed at a corresponding plurality of display position groups, each of which comprises a plurality of display positions. The symbols shown at the display positions are used to determine game outcomes by comparing the displayed symbols with defined winning combinations.

In one conventional type of gaming machine, a display area including 15 display positions is presented to a player with each display position including one symbol. The display positions are arranged in five vertically disposed reels, with each reel having three visible display positions. After the reels are spun and subsequently stopped, the display positions show a random selection of symbols.

Generally, with such games, a plurality of win patterns in the form of win lines are defined which extend across the reels and include one display position from each reel. Typically the symbols that form a win line are compared with winning symbol combinations defined in a pay table so as to determine whether a player of the game should receive an award. For example, if winning symbol combinations are based on poker hands, a particular prize would be awarded if the win line comprises four aces. Other winning symbol combinations and corresponding prizes may also be defined by a pay table.

Referring to the drawings, there is shown a schematic block diagram of a gaming machine 10 arranged to implement a probabilistic game of the type wherein several symbols from a set of symbols are randomly displayed, and a game outcome is determined on the basis of the displayed symbols. The gaming machine 10 is of the type including multiple game modes such as being operable in normal game mode wherein a base game is implemented and special game mode wherein a feature game is implemented.

With some such probabilistic games, the set of symbols used during normal game mode include standard symbols and function symbols, and the game outcome is determined on the basis of the displayed standard symbols and the function associated with any displayed function symbol. For example, standard symbols may resemble fruit such as apples, pears and bananas with a win outcome being determined when a predetermined number of the same fruit appear on a display along a win line, or are displayed according to defined outcome patterns such as scattered, and so on. The function associated with a function symbol may be for example a wild function wherein display of the function symbol is treated during consideration of the game outcome as any of the standard symbols. A function symbol may be represented as the word "WILD", a star, or by any other suitable word or symbol. Other functions are also envisaged such as scatter functions, multiplier functions, repeat win functions, jackpot functions and feature commencement functions.

Referring to FIG. 1, a schematic diagram of components of the gaming machine 10 is shown. The components comprise a player interface 30 and a game controller 32. The player interface 30 is arranged to enable interaction between a player and the gaming system and for this purpose includes input/output components for the player to enter instructions and play the game.

Components of the player interface 30 may vary but will typically include a credit mechanism 34 to enable a player to input credits and receive payouts, one or more displays 36 which may comprise a touch screen, and a game play mechanism 38 arranged to enable a player to input game play instructions.

The game play mechanism 38 is arranged to allow a player to instruct the gaming machine 10 to initiate spinning of reels, and to allow the player to instruct the gaming machine 10 to initiate a stopping sequence wherein the reels ultimately come to a rest. The player instructions may be input by pressing appropriate buttons such as buttons 62 shown in FIG. 3.

The game controller 32 is in data communication with the player interface 30 and typically includes a processor 40 arranged to process game play instructions and output game player outcomes to the display 36. Typically, the game play instructions are stored as program code in a memory 42 that can also be hardwired. It will be understood that in this specification the term "processor" is used to refer generically to any device that can process game play instructions and may include a microprocessor, microcontroller, programmable logic device or other computational device such as a personal computer or a server.

Figure 2:
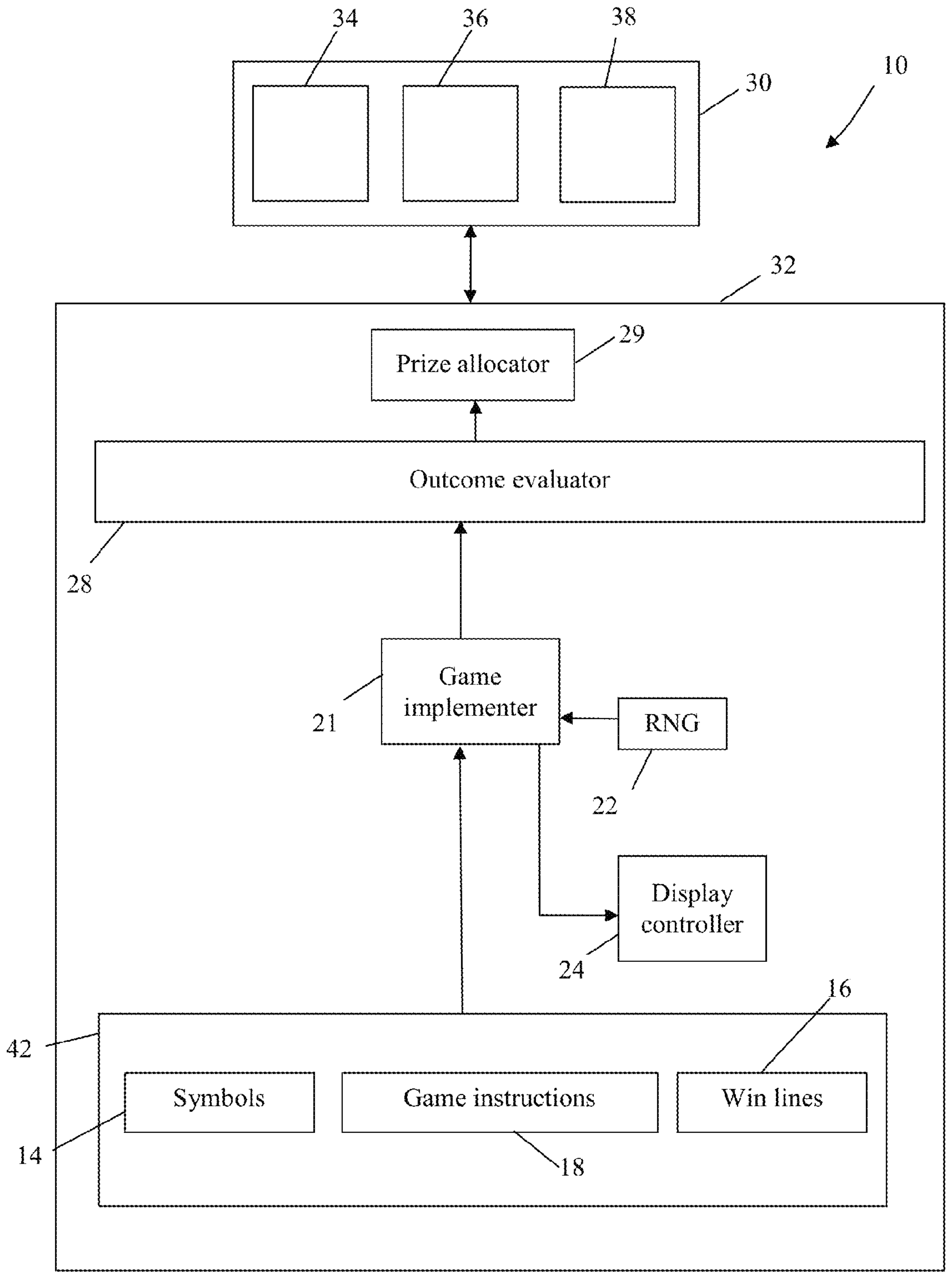
FIG. 2 is a schematic block diagram of functional components of a gaming system in accordance with an embodiment of the present invention.

A functional diagram illustrating operative components of the game controller 32 is shown in FIG. 2.

The memory 42 is arranged to store symbols data 14 indicative of a plurality of symbols, in the present example associated with a plurality of reels, win lines data 16 indicative of available win lines, and game instruction data 18 indicative of game instructions usable by the gaming machine 10 to control operation of the game.

The game controller 32 comprises a game implementer 21 which is arranged to select several symbols from the available symbols 14 for display to a player in a plurality of display positions of the reels. In this example, the selection carried out by the game implementer 21 is made using a random number generator 22.

It will be appreciated that the random number generator 22 may be of a type which is arranged to generate pseudo random numbers based on a seed number, and that in this specification the term "random" will be understood accordingly to mean truly random or pseudo random.

The game controller 32 further includes a display controller 24 arranged to control display of the reels at the one or more displays 36 and, in particular, to control the manner in which the reels spin and ultimately come to a rest so as to display at least one symbol on each reel.

The game controller 32 also comprises an outcome evaluator 28 which, in accordance with game instructions 18 determines game outcomes based on the symbols selected by the game implementer 21 for display to the player by the display controller 24.

The game controller 32 also comprises a prize allocator 29 arranged to allocate a prize to a player when a winning outcome exists.

In the embodiment described below, the game implementer 21, the random number generator 22, the display controller 24, the outcome evaluator 28, and the prize allocator 29 are at least partly implemented using the processor 40 and associated software although it will be understood that other implementations are envisaged.

The gaming machine 10 can take a number of different forms.

In a first form, a player operable gaming device in the form of a stand alone gaming machine is provided wherein all or most components to implement the game are present in the gaming machine.

In a second form, a distributed architecture is provided wherein some of the components to implement the game are present in a player operable gaming device and some of the components to implement the game are located remotely relative to the gaming device. For example, a "thick client" architecture may be used wherein part of the game is executed on a player operable gaming terminal and part of the game is executed remotely, such as by a gaming server; or a "thin client" architecture may be used wherein most of the game is executed remotely such as by a gaming server and a player operable gaming terminal is used only to display audible and/or visible gaming information to the player and receive gaming inputs from the player.

However, it will be understood that other arrangements are envisaged. For example, an architecture may be provided wherein a gaming device is networked to a device server and the respective functions of the gaming machine and the gaming server are selectively modifiable. For example, the gaming system may operate in stand alone gaming machine mode, "thick client" mode or "thin client" mode depending on the game being played, operating conditions, and so on. Other variations will be apparent to persons skilled in the art.

Figure 3:
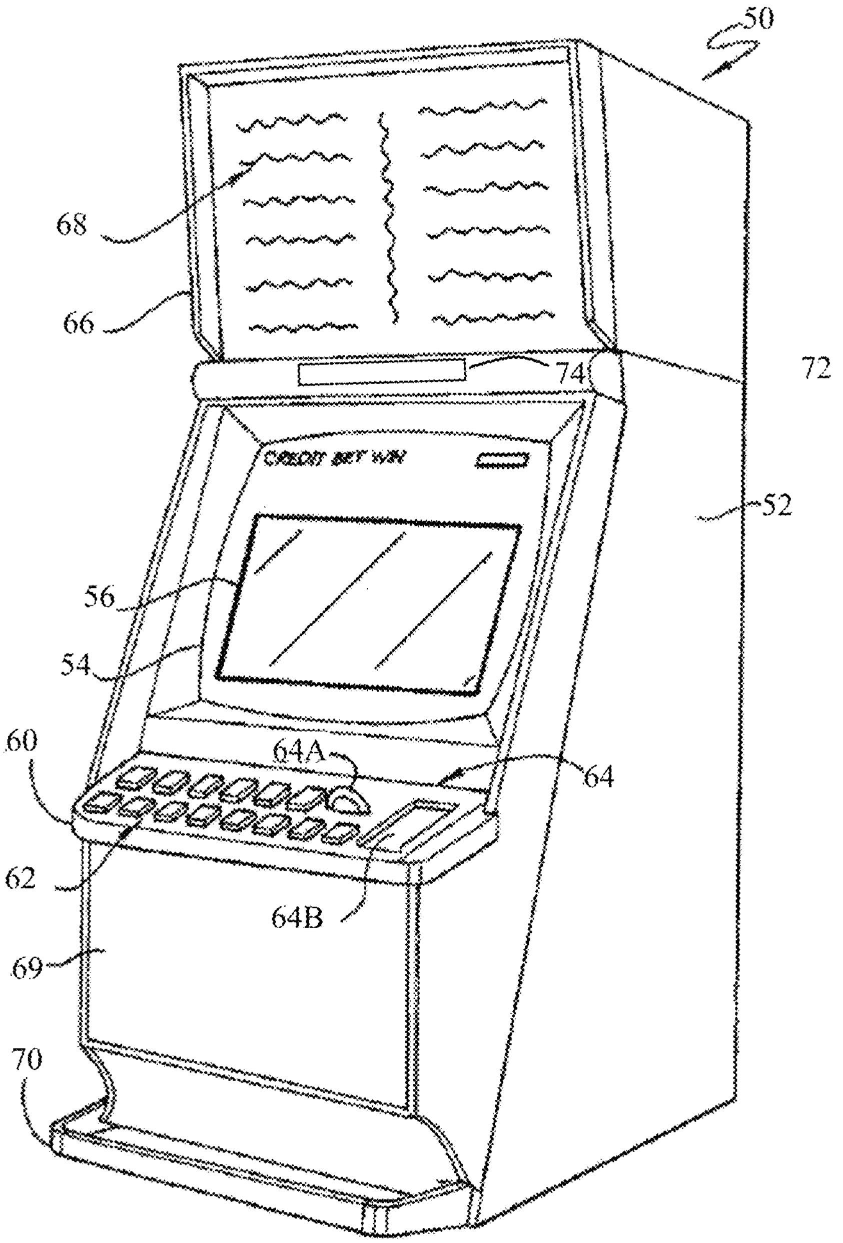
FIG. 3 is a diagrammatic representation of a gaming system in accordance with an embodiment of the present invention with the gaming system implemented in the form of a stand alone gaming machine.

A gaming machine in the form of a stand alone gaming machine 50 is illustrated in FIG. 3. The gaming machine 50 includes a console 52 having a display 54 on which is displayed representations of a game 56 that can be played by a player. A mid-trim 60 of the gaming machine 50 houses a bank of buttons 62 for enabling a player to interact with the gaming machine, in particular during gameplay. The mid-trim 60 also houses a credit input mechanism 64 which in this example includes a coin input chute 64A and a bill collector 64B. Other credit input mechanisms may also be employed, for example, a card reader for reading a smart card, debit card or credit card.

A top box 66 may carry artwork 68, including for example pay tables and details of bonus awards and other information or images relating to the game. Further artwork and/or information may be provided on a front panel 69 of the console 52. A coin tray 70 is mounted beneath the front panel 69 for dispensing cash payouts from the gaming machine 50.

The display 54 is in the form of a video display unit, particularly a cathode ray tube screen device. Alternatively, the display 54 may be a liquid crystal display, plasma screen, or any other suitable video display unit. The top box 66 may also include a display, for example a video display unit, which may be of the same type as the display 54, or of a different type. The display 54 may comprise a touch screen usable by a player to interact with the gaming machine, in particular during game play.

The display 54 in this example is arranged to display representations of several reels, each reel of which has several associated symbols. Typically 3, 4 or 5 reels are provided. During operation of the game, the reels first appear to rotate then stop with typically three symbols visible on each reel. Game outcomes are determined on the basis of the visible symbols together with any special functions associated with the symbols.

A player marketing module (PMM) 72 having a display 74 is connected to the gaming machine 50. The main purpose of the PMM 72 is to allow the player to interact with a player loyalty system. The PMM has a magnetic card reader for the purpose of reading a player tracking device, for example as part of a loyalty program. However other reading devices may be employed and the player tracking device may be in the form of a card, flash drive or any other portable storage medium capable of being read by the reading device. In this example, the PMM 62 is a Sentinel III device produced by Aristocrat Technologies Pty Ltd.

Figure 4:
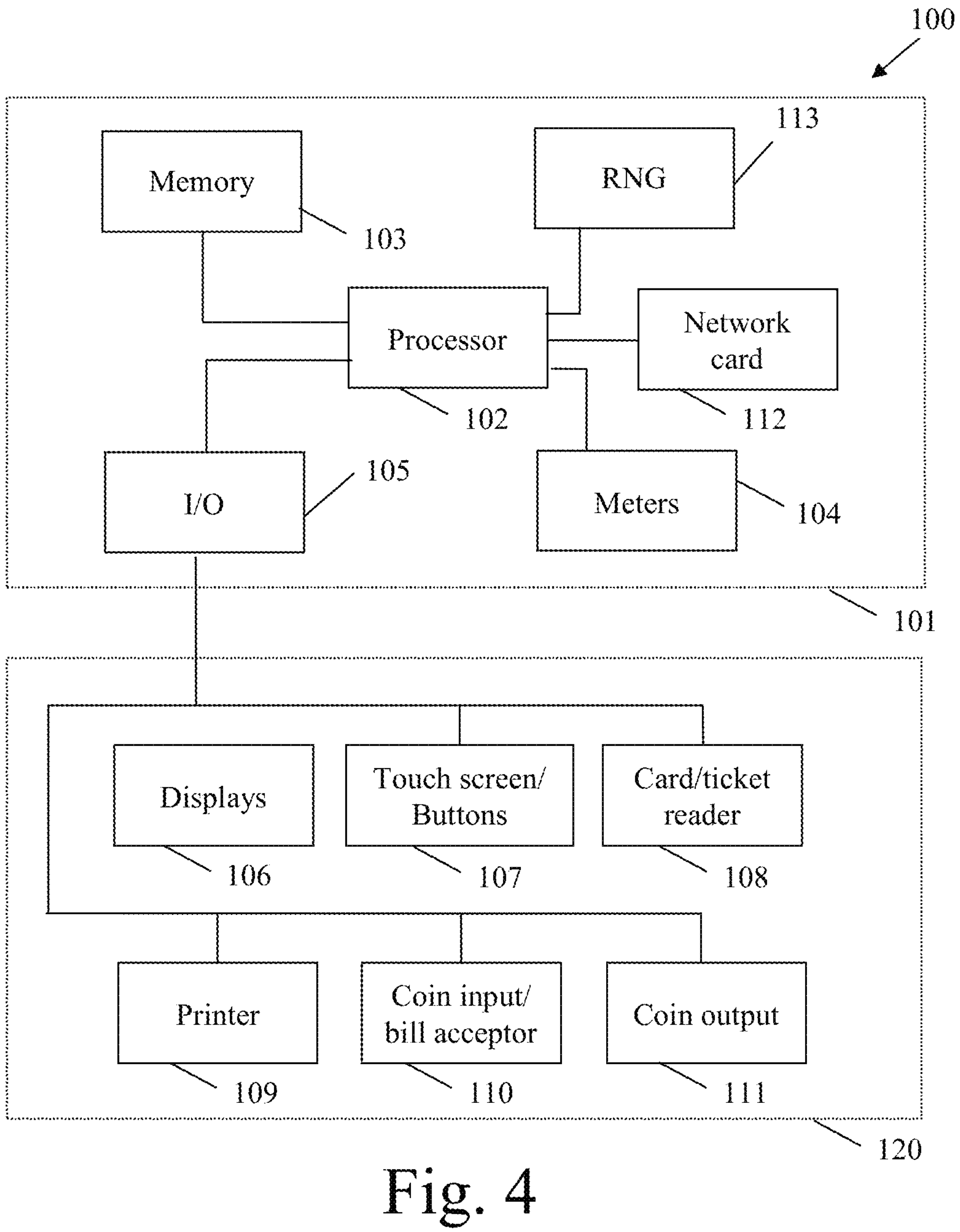
FIG. 4 is a schematic block diagram of operative components of the gaming machine shown in FIG. 3.

FIG. 4 shows a block diagram of operative components of a gaming device 100 which may be the same as or different to the gaming machine shown in FIG. 3.

The gaming machine 100 includes a game controller 101 having a processor 102. Instructions and data to control operation of the processor 102 in accordance with the present invention are stored in a memory 103 which is in data communication with the processor 102.

Typically, the gaming machine 100 will include both volatile and non-volatile memory and more than one of each type of memory, with such memories being collectively represented by the memory 103.

Figure 5:
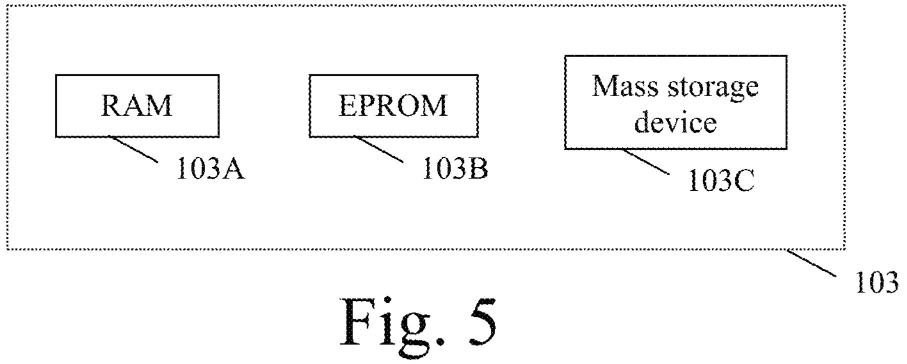
FIG. 5 is a schematic block diagram of components of a memory of the gaming machine shown in FIG. 3.

FIG. 5 shows a block diagram of the main components of an exemplary memory 103. The memory 103 includes RAM 103A, EPROM 103B and a mass storage device 103C. The RAM 103A typically temporarily holds program files for execution by the processor 102 and related data. The EPROM 103B may be a boot ROM device and/or may contain some system or game related code. The mass storage device 103C is typically used to store game programs, the integrity of which may be verified and/or authenticated by the processor 102 using protected code from the EPROM 103B or elsewhere.

The gaming machine has hardware meters 104 for purposes including ensuring regulatory compliance and monitoring player credit, an input/output (I/O) interface 105 for communicating with a player interface 120 of the gaming machine 100, the player interface 120 having several peripheral devices. The input/output interface 105 and/or the peripheral devices may be intelligent devices with their own memory for storing associated instructions and data for use with the input/output interface or the peripheral devices. A random number generator module 113 generates random numbers for use by the processor 102.

In the example shown in FIG. 4, the peripheral devices that communicate with the game controller 101 comprise one or more displays 106, a touch screen and/or bank of buttons 107, a card and/or ticket reader 108, a printer 109, a bill acceptor and/or coin input mechanism 110 and a coin output mechanism 111. Additional hardware may be included as part of the gaming machine 100, or hardware may be omitted based on a particular implementation.

In addition, the gaming machine 100 may include a communications interface, for example a network card 112. The network card may, for example, send status information, accounting information or other information to a central controller, server or database and receive data or commands from the central controller, server or database.

It is also possible for the operative components of the gaming machine 100 to be distributed, for example input/output devices 106, 107, 108, 109, 110, 111 may be provided remotely from the game controller 101.

Figure 6:
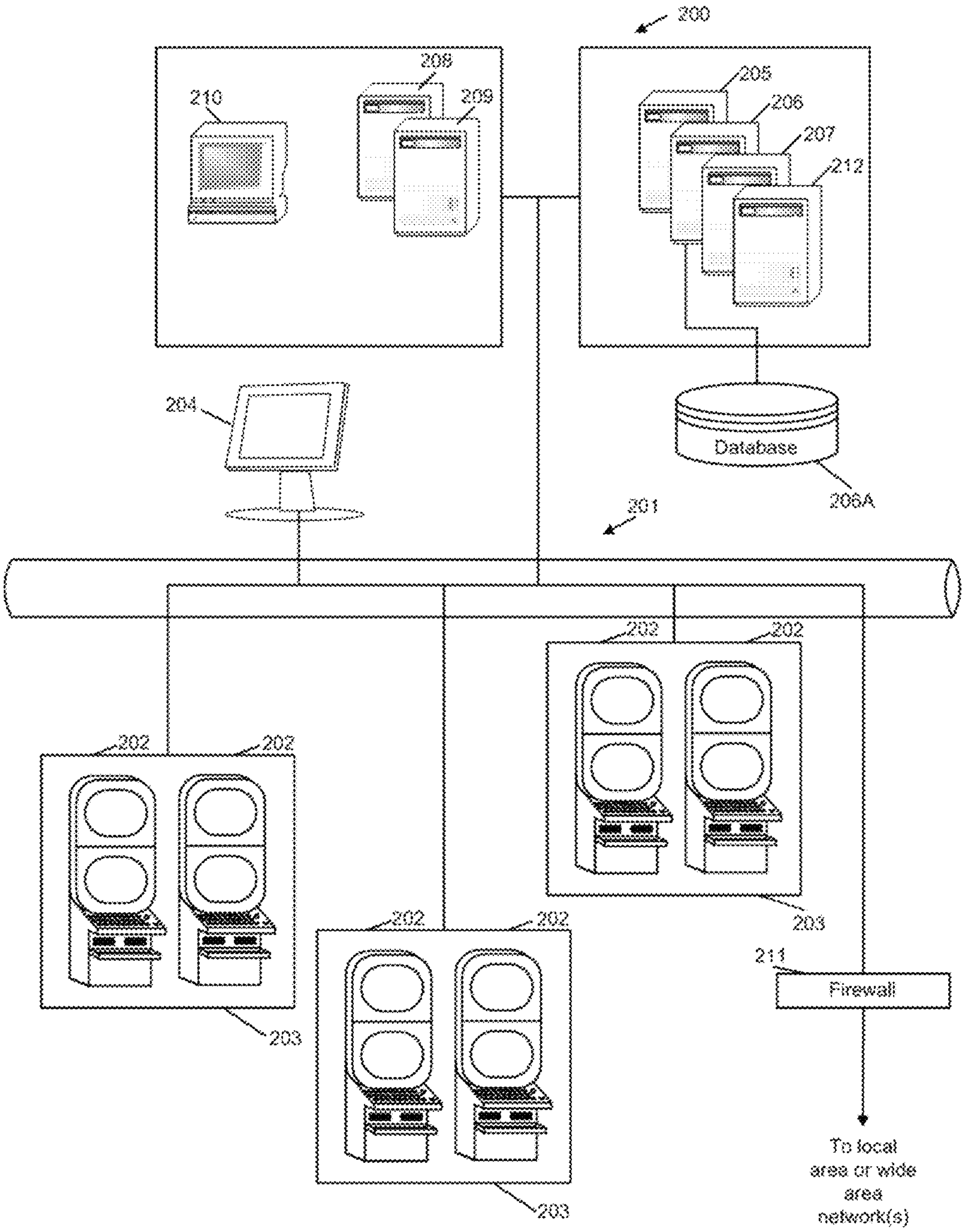
FIG. 6 is a schematic diagram of a gaming system in accordance with an alternative embodiment of the present invention wherein the gaming system is implemented over a network.

FIG. 6 shows a gaming system 200 in accordance with an embodiment of the present invention. The gaming system 200 includes a network 201, which for example may be an Ethernet network, a LAN or a WAN. In this example, three banks 203 of two gaming machines 202 are connected to the network 201. The gaming machines 202 provide a player operable interface and may be the same as the gaming machines 40,100 shown in FIGS. 3 and 4, or may have simplified functionality depending on the rules, guidelines, requirements, or preferences for implementing game play. While banks 203 of two gaming machines are illustrated in FIG. 6, banks of one, three or more gaming machines are also envisaged.

One or more displays 204 may also be connected to the network 201. The displays 204 may, for example, be associated with one or more banks 203 of gaming machines. The displays 204 may be used to display representations associated with game play on the gaming machines 202, and/or used to display other representations, for example promotional or informational material.

In a thick client embodiment, a game server 205 implements part of the game played by a player using a gaming machine 202 and the gaming machine 202 implements part of the game. With this embodiment, as both the game server 205 and the gaming machine 202 implement part of the game, they collectively provide a game controller. A database management server 206 may manage storage of game programs and associated data for downloading or access by the gaming devices 202 in a database 206A. Typically, if the gaming system enables players to participate in a jackpot game such as a progressive jackpot game, a jackpot server 207 will be provided to monitor and carry out the jackpot game.

In a variation of the above thick client embodiment, the gaming machine 202 may implement the game, with the game server 205 functioning merely to serve data indicative of a game to the gaming machine 202 for implementation.

With this implementation, a data signal containing a computer program usable by the client terminal to implement the gaming system may be transferred from the game server to the client terminal, for example in response to a request by the client terminal.

In a thin client embodiment, the game server 205 implements most or all of the game played by a player using a gaming machine 202 and the gaming machine 202 essentially provides only the player interface. With this embodiment, the game server 205 provides the game controller. The gaming machine will receive player instructions, and pass the instructions to the game server which will process them and return game play outcomes to the gaming machine for display. In a thin client embodiment, the gaming machines could be computer terminals, e.g. PCs running software that provides a player interface operable using standard computer input and output components.

Servers are also typically provided to assist in the administration of the gaming system 200, including for example a gaming floor management server 208 and a licensing server 209 to monitor the use of licenses relating to particular games. An administrator terminal 210 is provided to allow an administrator to monitor the network 201 and the devices connected to the network.

The gaming system 200 may communicate with other gaming systems, other local networks such as a corporate network, and/or a wide area network such as the Internet, for example through a firewall 211.

A loyalty program server 212 may also be provided.

Persons skilled in the art will appreciate that in accordance with known techniques, functionality at the server side of the network may be distributed over a plurality of different computers. For example, elements may be run as a single "engine" on one server or a separate server may be provided. For example, the game server 205 could run a random number generator engine. Alternatively, a separate random number generator server could be provided.

Examples of specific implementations of the gaming system will now be described in relation to a gaming system that is implemented using a network architecture of the type shown in FIG. 6, although it will be understood that implementation may be carried out using other appropriate gaming system architectures.

In this example, each gaming machine 202 comprises five reels, each reel corresponding to a display position group, each of which has an associated set of display positions for displaying symbols.

The reels are arranged to display standard symbols and one or more function symbols and win outcomes are determined on the basis of the symbols visible at the display positions when the reels stop rotating.

Typically, a player will purchase or otherwise obtain win entitlements such as several win lines which are used in the game to determine win outcomes. If the displayed symbols on the reels have symbols associated with a winning combination such as a winning combination disposed on a win line, the player wins a prize.

Each gaming machine 202 is operable in normal game mode and special game mode and may be arranged to commence special game mode when a predetermined game outcome occurs. Special game mode may comprise one or more free games. Special game mode may commence automatically on the basis of a game event occurring during a game such as display of a particular symbol, based on game outcomes determined by the gaming system, or may be prompted by a player pressing a button on the gaming machine 202 after the player has identified that a game outcome corresponding to special game mode requirements has occurred.

Each gaming machine 202 may also be arranged so as to determine eligibility for special game mode, for example based on the amount or type of bet placed, based on certain time periods and so on.

Special game mode may also be arranged to commence when a special game is purchased by a player.

The gaming machines 202 are arranged to contribute to a progressive jackpot award wherein players of the gaming machines 202 have the chance of winning at least a portion of the progressive jackpot award in response to achieving, for example, a particular jackpot win symbol combination. In this example, the progressive jackpot award is implemented by the jackpot server 207.

The jackpot server 207 is arranged to receive wager information from each gaming machine 202 and to add a portion of each wager that a player makes on a gaming machine 202 to a jackpot award, the jackpot award being stored as jackpot award information on the jackpot server 207.

Figure 10:
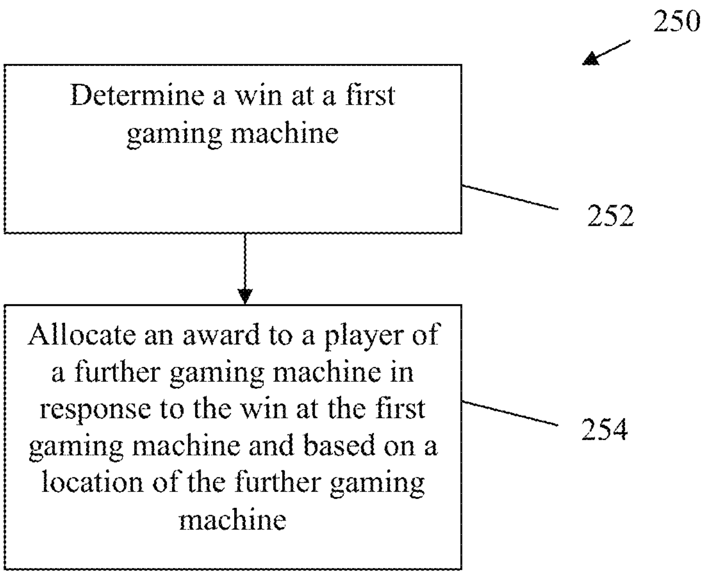
FIG. 10 is a flow diagram of a method of gaming in accordance with an embodiment of the present invention.

Generally, the jackpot server 207 is arranged to conduct method 250 shown in FIG. 10. The method 250 comprises a first step 252 of determining a win at a first gaming machine 202*a*. The method 250 comprises a second step 254 of allocating an award to a player of a further gaming machine 202*b* in response to the win at the first gaming machine 202*a* and based on a location of the further gaming machine 202*b*.

Figure 8:
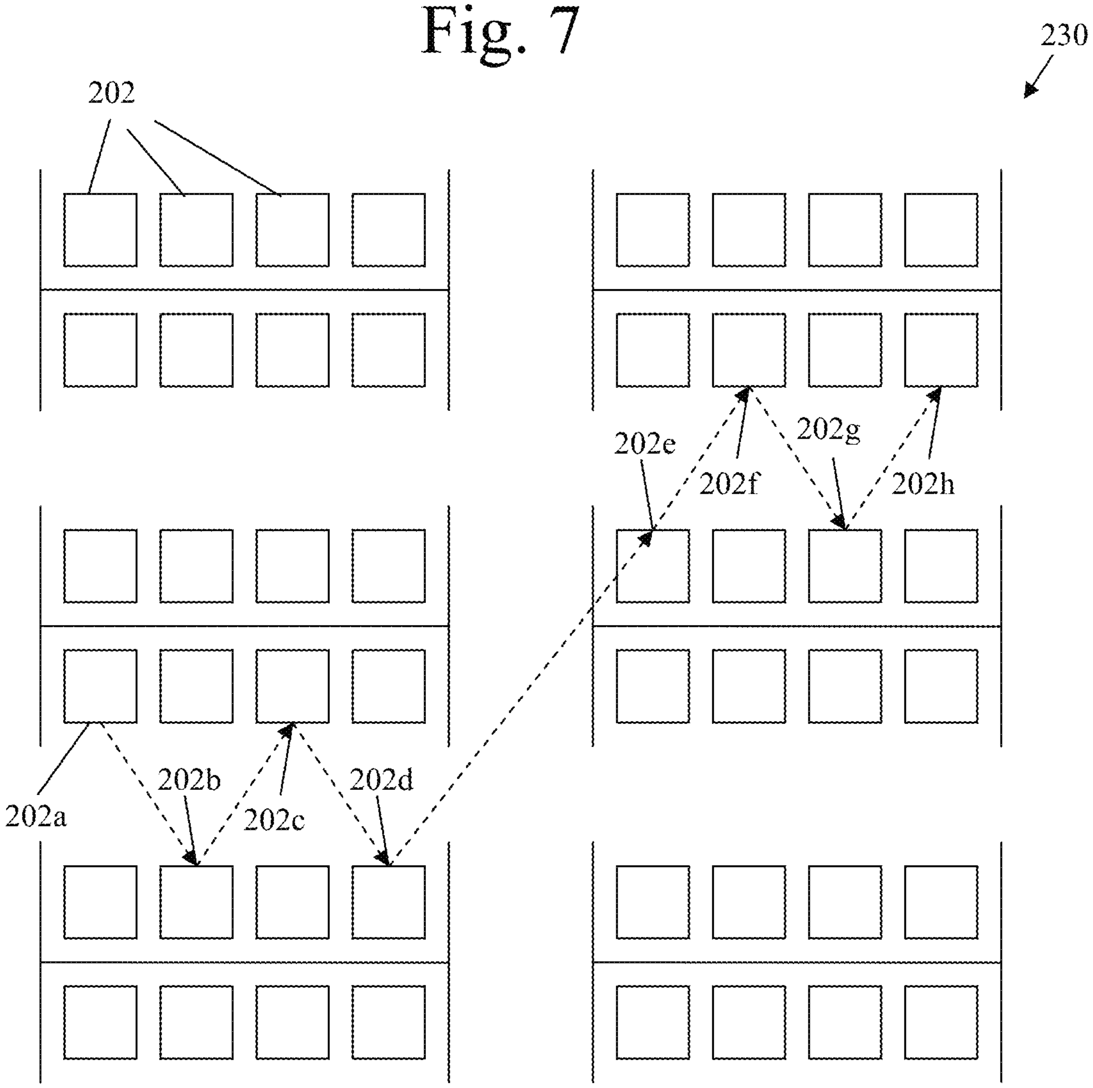
FIG. 8 is a representation of a gaming machine floor plan showing an award allocation sequence in accordance with an embodiment of the present invention.

The first gaming machine 202*a* and the further gaming machine 202*b* are shown, along with further gaming machines 202*c* to 202*h*, as part of a gaming machine floor plan 230 as illustrated in FIG. 8. In this example, the location information of the gaming machines 202 is obtained by using the casino industry standard G2S protocol. The G2S protocol allows the gaming machines 202 to be identified by their location in a casino. The location information can be transmitted over the network 201, for use in the method 250.

Figure 7:
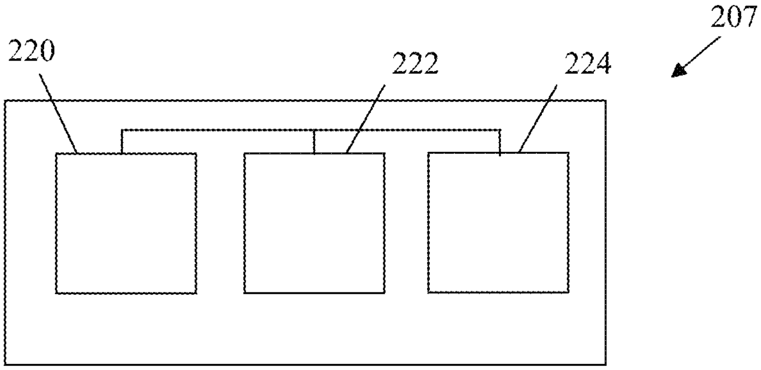
FIG. 7 is schematic diagram of a jackpot server in accordance with an embodiment of the present invention.

In this example, and with reference to FIG. 7, the jackpot server 207 comprises a gaming machine location information system 220 arranged to store location information indicative of a location of each gaming machine 202. The gaming machine location information may be manually entered for use by the system 200, or the location information may be received from the gaming machines 202, such as via the network 201 and by utilising the G2S protocol.

The jackpot server 207 also comprises a gaming machine win information receiver 222 arranged to receive win information indicative of a win at the gaming machines 202 and an award controller 224 for allocating an award at the gaming machines 202.The win information may comprise information that is indicative of the type of win that has been achieved at a particular gaming machine 202. If the win is of a predetermined type, such as a jackpot type win at the first gaming machine 202*a*, then this information is used to initiate the allocation of an award to players of the further gaming machines 202*b* to 202*h*.

The award controller 224 is arranged to allocate an award to a player of the further gaming machine 202*b* based on the location of the further gaming machine 202*b* and in response to a win at the first gaming machine 202*a*.

In addition to storing location information of the gaming machines 202, the gaming machine location information system 220 can store information indicative of the gaming machine floor plan 230. Stored gaming machine floor plans 230 can be used to define gaming machine location patterns that can be used to allocate awards to the gaming machines 202.

In one embodiment, the jackpot server 207, and particularly the award controller 224, is arranged to allocate at least a portion of the jackpot award to a player of the first gaming machine 202*a* that achieves the jackpot win symbol combination, and to allocate a portion of the jackpot award to respective players of the further gaming machines 202*b* to 202*h* in response to the jackpot win at the first gaming machine 202*a*.

In one embodiment, the jackpot server 207 is arranged to allocate an award to a player of the further gaming machines 202*b* to 202*h* based on the locations of the further gaming machines 202*b* to 202*h* relative to the location of the first gaming machine 202*a*. The relative locations of the further gaming machines 202*b* to 202*h* can be based on a pattern associated with the gaming machine floor plan 230, or a predetermined pattern or sequence having a starting point located at the first gaming machine 202*a*.

Referring now to the floor plan 230 of FIG. 8, the jackpot server 207 is arranged to allocate an award to the further gaming machines 202*b* to 202*h* sequentially in response to a win at the first gaming machine 202*a*. In this example, the jackpot server 207 is arranged to allocate an award in a zig-zag like pattern, or stated differently, the allocated award 'bounces' from gaming machine to gaming machine in a particular sequence. The dashed arrows of FIG. 8 indicate the sequence of the award allocation to the further gaming machines 202*b* to 202*h*. In this example, players of gaming machines 202*a* to 202*h* receive their awards in sequence. Further, the gaming machines 202*a* to 202*h* are arranged to respond to receiving their respective award by outputting predetermined lighting and sound effects such that it is apparent that the gaming machines 202*a* to 202*h* are receiving an award in response to the win at the first gaming machine 202*a*.

Although in the above example awards are allocated to gaming machines 202*b* to 202*h* in sequence from nearest to furthest with respect to the first gaming machine 202*a*, it will be appreciated that awards can be allocated at substantially the same time.

Generally, the jackpot server 207 is arranged to allocate awards to gaming machines 202 in accordance with both the location of the gaming machines 202 and time. For example, awards can be allocated to gaming machines 202 in a sequence radiating outwardly from the first gaming machine 202*a*, or in such a way that awards are allocated to gaming machines 202 in a particular geometric progression based on their floor plan layout.

In one example, awards are allocated in a sequence and according to a location pattern such that, when viewed from above, the gaming machines appear to be allocated an award in accordance with a ripple-like pattern, in a pattern that appears to bounce from one gaming machine to a next gaming machine (as shown in FIG. 8), in a moving concentric circle pattern, or in any other desirable or appropriate sequence or pattern. As mentioned, each gaming machine 202 that is allocated an award may be arranged to output particular lighting and sound effects so that an observer would recognise that the gaming machines are being allocated an award in response to a win at a first gaming machine 202*a*.

Figure 9:
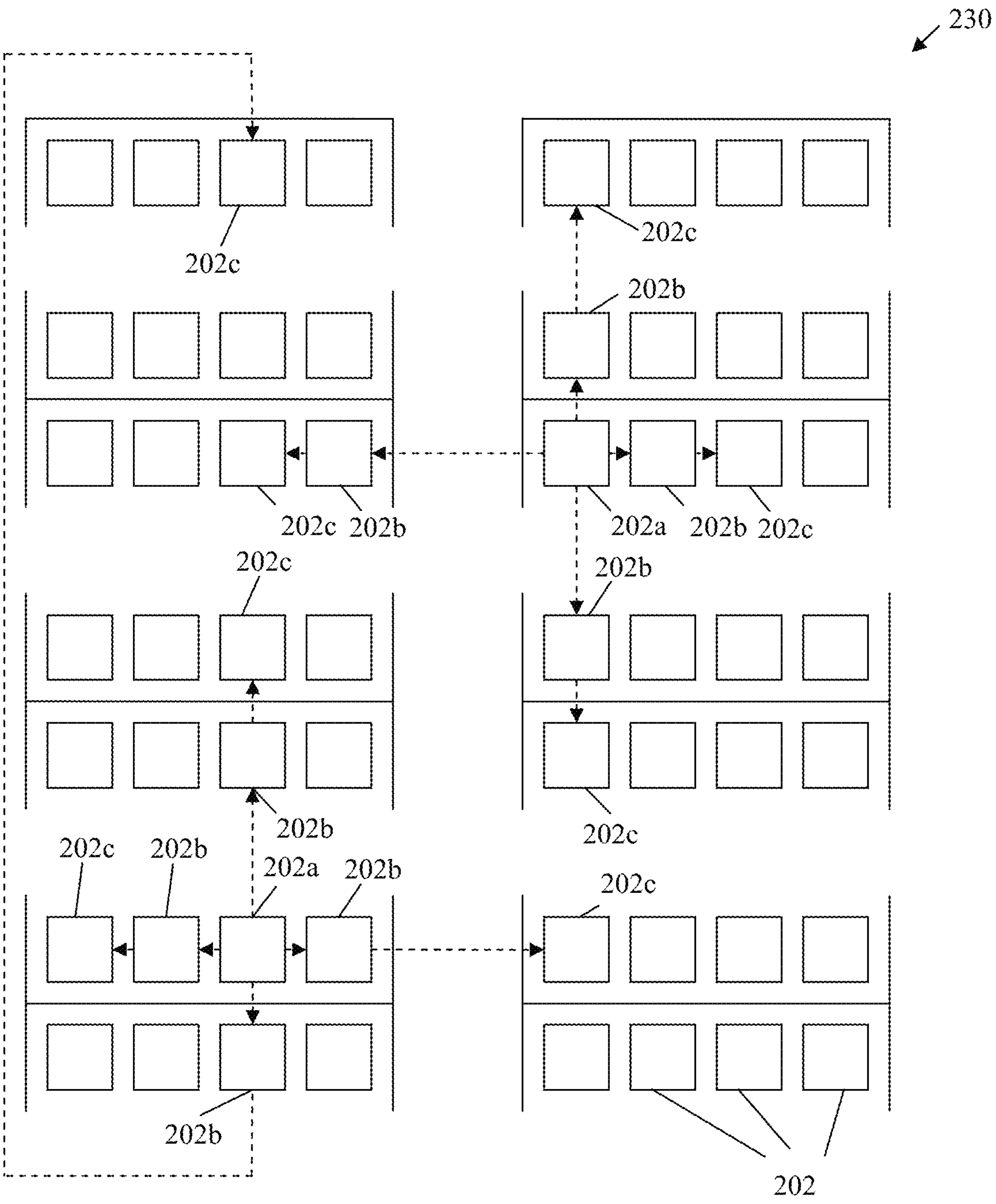
FIG. 9 is a representation of a gaming machine floor plan showing an award allocation sequence in accordance with an embodiment of the present invention.

Another example is described with reference to FIG. 9. In this example, an award is provided to players of the further gaming machines 202*b* that are horizontally or vertically adjacent the first gaming machine 202*a*. After this initial award is allocated to the further gaming machines 202*b*, an award is then provided to players of the further gaming machines 202*c*. In this example, the further gaming machines 202*c* are located adjacent a respective further gaming machine 202*b* and in a same line radiating outwardly from the first gaming machine 202*a*.

Many other variations in award allocation patterns are envisaged. For example, an award allocation pattern may be any appropriate geometric pattern radiating outwardly from the first gaming machine 202*a*, such as a pattern in the shape of an expanding star or circle, or the sequence of award allocations to the gaming machines 202 may be randomly generated.

It will also be appreciated that the location of a further gaming machine 202 to which an award is allocated in response to a win at another gaming machine 202 may not necessarily have to be relative to the location of the first gaming machine 202. For example, the gaming system 200 may be arranged to allocate awards to gaming machines 202 according to a predetermined allocation pattern, such as an allocation pattern determined based on a floor plan 230 and that is stored in the jackpot server 207, in response to a jackpot type win at any gaming machine 202.

Further, although the above describes the jackpot server 207 as allocating at least a portion of the jackpot award to a player of a further gaming machine 202*b*, it will be appreciated that the award provided to a player of a further gaming machine 202*b* may be separate to a jackpot award provided to the player of the first gaming machine 202*a*. Further, it will be appreciated that the award provided to the player of the first gaming machine 202*a* need not necessarily be a progressive jackpot award.

Modifications and variations as would be apparent to a skilled addressee are determined to be within the scope of the present invention.

For example, the gaming system 200 may be implemented as a computer program that is arranged, when loaded into a computing device, to instruct the computing device to operate in accordance with the gaming system 200.

Further, or alternatively, the gaming system 200 may be provided in the form of a computer readable medium having a computer readable program code embodied therein for causing a computing device to operate in accordance with the gaming system 200.

Still further, or alternatively, the gaming system 200 may be provided in the form of a data signal having a computer readable program code embodied therein to cause a computing device to operate in accordance with the gaming system 200.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

Various inventions have been described in sufficient detail with a certain degree of particularity. It is understood to those skilled in the art that the present disclosure of embodiments has been made by way of examples only and that numerous changes in the arrangement and combination of parts can be resorted without departing from the spirit and scope of the present disclosure as claimed. While the embodiments discussed herein can appear to include some limitations as to the presentation of the information units, in terms of the format and arrangement, the embodiments have applicability well beyond such embodiment, which can be appreciated by those skilled in the art. Accordingly, the scope of the present disclosure is defined by the appended claims rather than the forgoing description of embodiments.

The invention claimed is:

1. A gaming system comprising:

a plurality of gaming machines including at least a first gaming machine and a plurality of second gaming machines positioned a first distance radially outward from the first gaming machine, each gaming machine of the plurality of gaming machines comprising a credit input mechanism, a player interface, and a client game controller, each gaming machine configured to;

receive, by said client game controller of the first gaming machine, player input signals and a wager from a player to initiate a gaming session, the player input signals input by the player using the player interface, the wager received via the credit input device;

transmit, by said client game controller, a request for a game outcome to a server game controller, the request including game parameters determined by said client game controller; and a server system communicatively coupled to each of the plurality of gaming machines, said server system comprising a random number generator, a server game controller, and a server jackpot controller, said server system configured to:

add, by said server jackpot controller, a portion of each wager from each gaming machine to a progressive jackpot award;

determine, by said server game controller, outcome information for the gaming session based on the request for the game outcome from said client game controller, the outcome information based on the game parameters determined by said gaming machine and a random number generated by said random number generator, the outcome information representing a result for the gaming session;

receive, by said server jackpot controller, win information from the first gaming machine, the win information based on the outcome information and indicating a progressive jackpot type of win at the first gaming machine; and distribute, by said server jackpot controller, a first portion of the progressive jackpot award to the first gaming machine and distribute a second portion of the progressive jackpot award to the plurality of second gaming machines in a moving concentric circle pattern such that, when viewed from above, the first gaming machine appears to distribute the second portion radially outward to the plurality of second gaming machines.

2. The gaming system of claim 1, wherein said server jackpot controller is configured to receive location information indicative of a location of at least the first gaming machine and the plurality of second gaming machines, and to distribute the second portion of the progressive jackpot award to the plurality of second gaming machines based on the location of the second gaming machine relative to the location of the first gaming machine.

3. The gaming system of claim 1, wherein said server jackpot controller is configured to distribute at least two other portions of the progressive jackpot award to at least two other gaming machines, sequentially.

4. The gaming system of claim 3, wherein said server jackpot controller is configured to distribute the first portion of the progressive jackpot award to the first gaming machine, and thereafter distribute the second portion of the progressive jackpot award to the plurality of second gaming machines.

5. The gaming system of claim 3, wherein said server jackpot controller is configured to distribute a plurality of other portions of the progressive jackpot award to a plurality of other gaming machines, sequentially, and based on a location of each other gaming machine relative to the first gaming machine such that the plurality of other portions of the progressive jackpot award are distributed in order of a distance of each other gaming machine from the first gaming machine.

6. The gaming system of claim 1, wherein said server jackpot controller is further configured to distribute a plurality of other portions of the progressive jackpot award to a plurality of other gaming machines in a sequence and according to a location pattern such that, when viewed from above, the other gaming machines appear to distribute the plurality of other portions of the progressive jackpot award in accordance with a ripple-like pattern, in a pattern that appears to bounce from one gaming machine to a next gaming machine.

7. The gaming system of claim 1, wherein each other gaming machine that is distributed the second portion of the progressive jackpot award provides a response thereto indicating an understanding that the distribution of the second portion of the progressive jackpot award to the respective other gaming machine is linked to the win at the first gaming machine.

8. A method of gaming using a gaming system including a plurality of gaming machines and a server system communicatively coupled to each of the plurality of gaming machines, the plurality of gaming machines including at least a first gaming machine and a plurality of second gaming machines positioned a first distance radially outward from the first gaming machine, each gaming machine including a credit input mechanism, a player interface, and a client game controller, the server system including a random number generator, a server game controller, and a server jackpot controller said method comprising:

receiving, by the client game controller of the first gaming machine, player input signals and a wager from a player to initiate a gaming session, the player input signals input by the player using the player interface, the wager received via the credit input device;

transmitting, by the client game controller, a request for a game outcome to the server game controller, the request including game parameters determined by the client game controller;

adding, by the server jackpot controller, a portion of each wager from each gaming machine to a progressive jackpot award;

determining, by the server game controller, outcome information for the gaming session based on the request for the game outcome from the client game controller, the outcome information based on the game parameters determined by the client game controller and a random number generated by the random number generator, the outcome information representing a result for the gaming session;

receiving, by the server jackpot controller, win information from the first gaming machine, the win information based on the outcome information and indicating a progressive jackpot type of win at the first gaming machine; and distributing, by the server jackpot controller, a first portion of the progressive jackpot award to the first gaming machine, and distributing a second portion of the progressive jackpot award to the plurality of second gaming machines in a moving concentric circle pattern such that, when viewed from above, the first gaming machine appears to distribute the second portion radially outward to the plurality of second gaming machines.

9. The method of claim 8, further comprising:

receiving location information indicative of a location of at least the first gaming machine and the plurality of second gaming machines; and distributing the second portion of the progressive jackpot award to the plurality of second gaming machines based on the location of the plurality of second gaming machines relative to the location of the first gaming machine.

10. The method of claim 8, wherein distributing the second portion of the progressive jackpot award further comprises:

distributing a plurality of other portions of the progressive jackpot award to a plurality of other gaming machines of the plurality of gaming machines positioned radially outward from the plurality of second gaming machines in accordance with a location pattern of the plurality of other gaming machines relative to the first gaming machine.

11. The method of claim 10, wherein the location pattern is associated with a floor plan layout of the plurality of gaming machines.

12. The method of claim 8, wherein distributing the second portion of the progressive jackpot award further comprises:

distributing at least two other portions of the progressive jackpot award to at least two other gaming machines, sequentially.

13. The method of claim 12, wherein distributing comprises:

distributing the first portion of the progressive jackpot award to the first gaming machine, and thereafter distributing the second portion of the progressive jackpot award to the plurality of second gaming machines.

14. The method of claim 12, wherein distributing the second portion of the progressive jackpot award further comprises:

distributing a plurality of other portions of the progressive jackpot award to a plurality of other gaming machines of the plurality of gaming machines, sequentially, and based on a location of each other gaming machine relative to the first gaming machine such that the plurality of other portions of the progressive jackpot award are distributed in order of a distance of each other gaming machine from the first gaming machine.

15. The method of claim 8, wherein distributing the second portion of the progressive jackpot award further comprises:

distributing a plurality of other portions of the progressive jackpot award to a plurality of other gaming machines of the plurality of gaming machines in accordance with a particular geometric progression based on a floor plan layout of the plurality of gaming machines.

16. The method of claim 15, wherein the plurality of other portions of the progressive jackpot award are distributed in a sequence and according to a location pattern such that, when viewed from above, the other gaming machines appear to distribute the plurality of other portions of the progressive jackpot award in accordance with a ripple-like pattern, in a pattern that appears to bounce from one gaming machine to a next gaming machine.

17. The method of claim 8, wherein each other gaming machine that is distributed a portion of the progressive jackpot award provides a response thereto indicating an understanding that the distribution of the other portion of the progressive jackpot award to the respective other gaming machine is linked to the win at the first gaming machine.

18. The method of claim 8, wherein the first and the plurality of second gaming machines are linked to one another such that the first and the plurality of second gaming machines each contribute to the progressive jackpot award.

19. A tangible non-transitory computer readable medium including a computer program configured, when executed on a computer, to instruct the computer to implement a method of gaming, the method of gaming comprising:

adding, by a server jackpot controller of the computer, a portion of each wager of a gaming session received from each gaming machine of a plurality of gaming machines to a progressive jackpot award for a progressive jackpot, the plurality of gaming machines including at least a first gaming machine and a plurality of second gaming machines positioned a first distance radially outward from the first gamin machine, each wager received via a credit input device of one of the plurality of gaming machines;

determining, by a server game controller of the computer, outcome information for the gaming session based on a request for a game outcome received from the first gaming machine, the outcome information based on the game parameters determined by the first gaming machine and a random number generated by a random number generator, the outcome information representing a result for the gaming session;

receiving, by the server jackpot controller of the computer, win information from the first gaming machine, the win information based on the outcome information and indicating a progressive jackpot type of win at the first gaming machine; and the plurality of second gaming machines in a moving concentric circle pattern such that, when viewed from above, the first gaming machine appears to distribute the second portion radially outward to the plurality of second gaming machines;

distributing, by the server jackpot controller of the computer, a first portion of the progressive jackpot award to the first gaming machine, and distributing a second portion of the progressive jackpot award to the plurality of second gaming machines in a moving concentric circle pattern such that, when viewed from above, the first gaming machine appears to distribute the second portion radially outward to the plurality of second gaming machines.

20. A gaming system comprising:

a plurality of gaming machines including at least a first gaming machine and a plurality of second gaming machines positioned a first distance radially outward from the first gaming machine, each gaming machine of the plurality of gaming machines comprising a credit input mechanism, a player interface, and a client game controller, each gaming machine configured to;

receive, by said client game controller of the first gaming machine, player input signals and a wager from a player to initiate a gaming session, the player input signals input by the player using the player interface, the wager received via the credit input device; and transmit, by said client game controller, a request for a game outcome to a server game controller, the request including game parameters determined by said client game controller; and a server system communicatively coupled to each of the plurality of gaming machines, said server system comprising a random number generator, a server game controller, and a server jackpot controller, said server system configured to:

add, by said server jackpot controller, a portion of each wager from each gaming machine to a progressive jackpot award;

determine, by said server game controller, outcome information for the gaming session based on the request for the game outcome from said client game controller, the outcome information based on the game parameters determined by said gaming machine and a random number generated by said random number generator, the outcome information representing a result for the gaming session;

receive, by said server jackpot controller, win information from the first gaming machine, the win information based on the outcome information and indicating a progressive jackpot type of win at the first gaming machine; and distribute, by said server jackpot controller, a first portion of the progressive jackpot award to the first gaming machine and distribute a second portion of the progressive jackpot award to the plurality of second gaming machines in accordance with a location pattern of the plurality of second gaming machines relative to the first gaming machine.

21. A gaming system comprising:

a plurality of gaming machines including at least a first gaming machine and a plurality of second gaming machines positioned a first distance radially outward from the first gaming machine, each gaming machine of the plurality of gaming machines comprising a credit input mechanism, a player interface, and a client game controller, each gaming machine configured to;

receive, by said client game controller of the first gaming machine, player input signals and a wager from a player to initiate a gaming session, the player input signals input by the player using the player interface, the wager received via the credit input device;

transmit, by said client game controller, a request for a game outcome to a server game controller, the request including game parameters determined by said client game controller; and a server system communicatively coupled to each of the plurality of gaming machines, said server system comprising a random number generator, a server game controller, and a server jackpot controller, said server system configured to:

add, by said server jackpot controller, a portion of each wager from each gaming machine to a progressive jackpot award;

determine, by said server game controller, outcome information for the gaming session based on the request for the game outcome from said client game controller, the outcome information based on the game parameters determined by said gaming machine and a random number generated by said random number generator, the outcome information representing a result for the gaming session;

receive, by said server jackpot controller, win information from the first gaming machine, the win information based on the outcome information and indicating a progressive jackpot type of win at the first gaming machine; and distribute, by said server jackpot controller, a first portion of the progressive jackpot award to the first gaming machine and distribute a second portion of the progressive jackpot award to the plurality of second gaming machines in accordance with a floor plan layout of the plurality of second gaming machines.

22. A gaming system comprising:

a plurality of gaming machines including at least a first gaming machine and a plurality of second gaming machines positioned a first distance radially outward from the first gaming machine, each gaming machine of the plurality of gaming machines comprising a credit input mechanism, a player interface, and a client game controller, each gaming machine configured to;

receive, by said client game controller of the first gaming machine, player input signals and a wager from a player to initiate a gaming session, the player input signals input by the player using the player interface, the wager received via the credit input device;

transmit, by said client game controller, a request for a game outcome to a server game controller, the request including game parameters determined by said client game controller; and a server system communicatively coupled to each of the plurality of gaming machines, said server system comprising a random number generator, a server game controller, and a server jackpot controller, said server system configured to:

add, by said server jackpot controller, a portion of each wager from each gaming machine to a progressive jackpot award;

determine, by said server game controller, outcome information for the gaming session based on the request for the game outcome from said client game controller, the outcome information based on the game parameters determined by said gaming machine and a random number generated by said random number generator, the outcome information representing a result for the gaming session;

receive, by said server jackpot controller, win information from the first gaming machine, the win information based on the outcome information and indicating a progressive jackpot type of win at the first gaming machine; and distribute, by said server jackpot controller, a first portion of the progressive jackpot award to the first gaming machine and distribute a second portion of the progressive jackpot award to the plurality of second gaming machines in accordance with a particular geometric progression based on a floor plan layout of the plurality of second gaming machines.

* * * * *